United States Patent [19]

Mattern

[11] 4,063,200
[45] Dec. 13, 1977

[54] HYBRID MULTIPLEXED FILTER

[75] Inventor: John Mattern, Baltimore, Md.

[73] Assignee: Westinghouse Electric Corporation, Pittsburgh, Pa.

[21] Appl. No.: 656,911

[22] Filed: Feb. 10, 1976

[51] Int. Cl.² .................. H03H 7/10; H03H 7/28; H03K 5/159; H04J 3/06
[52] U.S. Cl. .................. 333/70 A; 364/602; 364/862; 307/221 D; 333/70 T
[58] Field of Search .......... 333/70 A, 70 R, 70 T, 333/29, 18, 28 R; 328/167; 307/221 C, 221 D, 295; 235/152, 150.5; 179/15 R, 15 A

[56] References Cited

U.S. PATENT DOCUMENTS

| | | | |
|---|---|---|---|
| 3,622,916 | 11/1971 | Fjallbrant | 333/70 A |
| 3,740,591 | 6/1973 | Butler et al. | 307/295 |
| 3,987,293 | 10/1976 | Crooke et al. | 307/221 D X |

Primary Examiner—Alfred E. Smith
Assistant Examiner—Marvin Nussbaum
Attorney, Agent, or Firm—H. W. Patterson

[57] ABSTRACT

A multiplexed filter bank having a digital by analog multiplier for weighting sampled input signals by digital constants is disclosed. The digital constants are stored and sequenced to the multiplier by a programmable read only memory.

9 Claims, 5 Drawing Figures

FIG.1

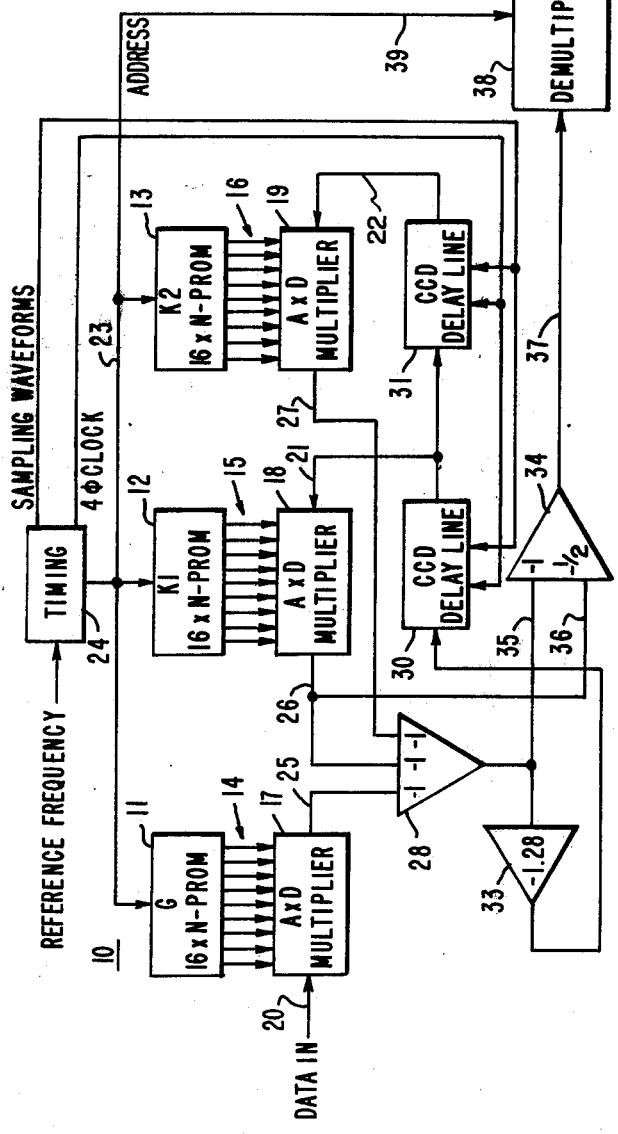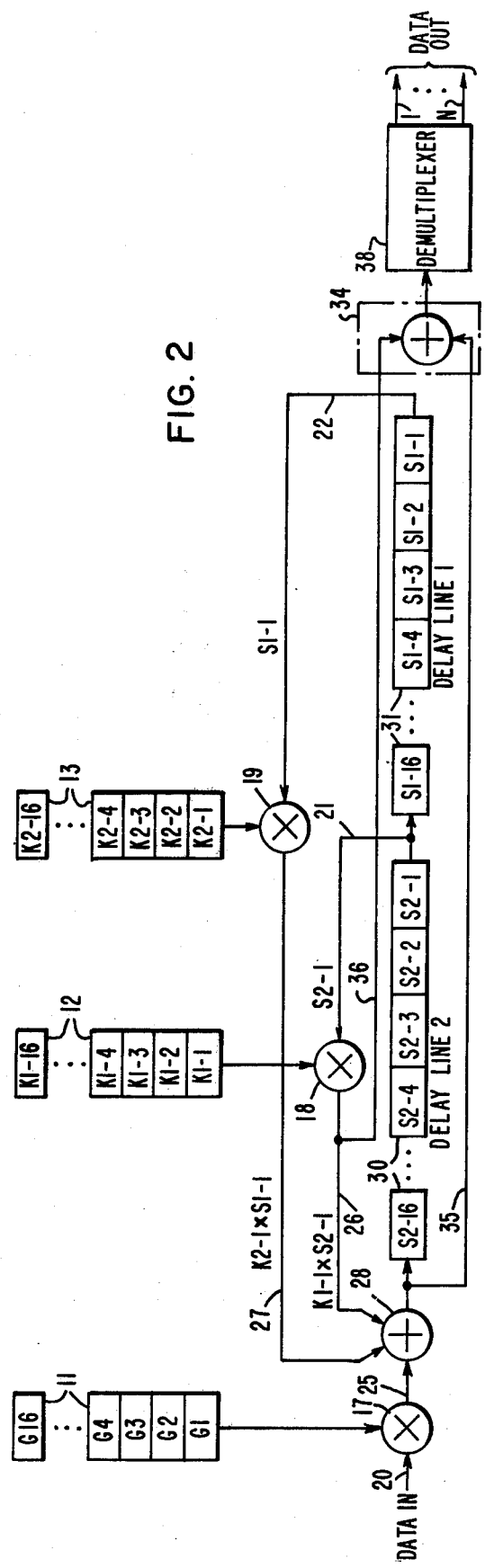

HYBRID MULTIPLEXED FILTER

BACKGROUND OF THE INVENTION

1. Field of the Invention

The present invention relates to a multiplexed recursive filter bank.

2. Description of the Prior Art

In radar systems, where weak narrow band doppler signals are masked by wide band doppler noise, the detectability of the narrow band signal is improved by matched filters; that is, a filter where the bandwidth is chosen to produce a maximum signal to noise ratio at the output. Also, filter banks operating in the frequency range below several KHz have application in target identification. Radar target signature characteristics which permit identification based on frequency discrimination are the doppler frequency shift and spurious frequencies caused by target movement other than forward motion. These spurious frequencies tend to be unique to a particular target and can be interpreted by means of a filter bank.

Therefore, parallel filtering by a contiguous bank of matched filters is frequently used to achieve reliable detection of signals whose doppler frequency and time of occurrence are unknown. In general, the signals at the higher doppler frequencies are of shorter duration than those at lower doppler frequencies, so the matched filter bandwidth increases with frequency.

Heretofore, matched filters were used that were completely analog in nature; or were completely digital in nature; that is to say, both the weighting of the sampled pulses and the delay line, was accomplished solely, either by digital devices or analog devices. A recursive type matched filter with a single channeled output is proposed in U.S. Pat. No. 3,622,916, issued Nov. 23, 1971, which suggests utilizing addition circuits that provide for adding the sampled signal to the filter in digital form, so that the delay circuits may consist of a digital shift register. Also, U.S. Pat. No. 3,740,591 shows a charge transfer device recursive filter where the analog signal delay has been implemented by a bucket brigade device to achieve a single band pass filter. The characteristics are determined by feedback factors and the analog signal delay time. The usable pass band of such a recursive filter involves only frequencies less than the Nyquist limit, associated with the minimum sampling rate. Often the input signal of a recursive filter is over sampled by a predetermined factor, requiring that the charge transfer device analog delay line has the capability of storing and shifting the predetermined analog signal samples at a sampling rate that is equal to the predetermined over sampled factor divided by the analog signal delay time. The filter described in U.S. Pat. No. 3,740,591 does not utilize over sampling. Consequently only one filter characteristic resulted from the two pole recursive filter network.

While it is desirable to provide a single device that would provide more than one filter characteristic without the necessity of changing the constants, such as by switching resistors in and out would result in a cumbersome device. Also, it is desirable to provide a multiplexed filter that weights the analog signal samples with a digital constant without the necessity of being preceded by an analog to digital converter. Also, it is desirable to provide a filter which allows both uniform and non-uniform filter bank designs and where the filter complexity does not increase rapidly with the number of independent channels; and also where the center frequency and bandwidth of the filter are independent of the number of channels. Finally, to take advantage of the great storage capacity of charge coupled devices, the constants may be stored in a digital memory, while the weighting is accomplished in an A/D multiplier using a digital dddress to the memory for sequencing the constants.

SUMMARY OF THE INVENTION

An improved multiplexed recursive filter having a means for weighting digitally an analog sampled signal; and also includes an analog delay line.

More particularly, an improved multiplexed two pole recursive filter bank for providing a plurality of discrete outputs, each representative of a particular input frequency, is provided. The filter includes a programmable read only memory for each characteristic to be detected which stores and sequences digital constants. The digital constants are multiplied with the analog signal samples in an analog by digital multiplier. An analog delay line of the charge coupled device type transfers the weighted samples; and a demultiplexer accepts the weighted samples in serial form and produces a discrete output for each of a predetermined number of frequencies.

BRIEF DESCRIPTION OF THE DRAWINGS

FIG. 1 is a schematic block diagram of a multiplexed recursive filter in accordance with one embodiment of the invention;

FIG. 2 is a schematic block diagram to illustrate the function of the multiplexed filter of FIG. 1 with respect to the weighting and transferring of an input sample;

DESCRIPTION OF THE PREFERRED EMBODIMENT

Figure 3:
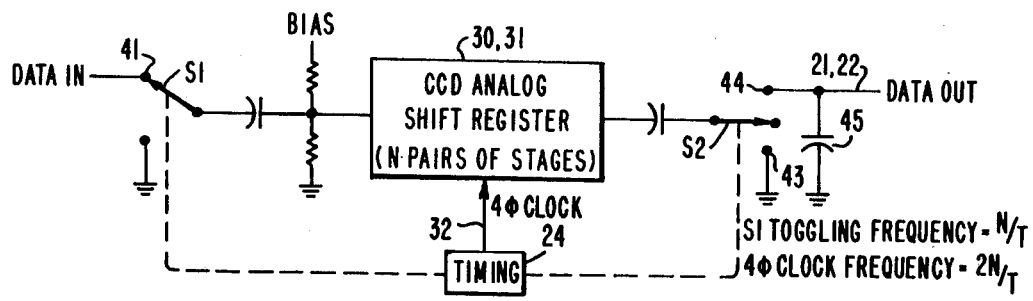
FIG. 3 is a schematic diagram of the charge coupled device analog shift register utilized to delay the signal samples in the filter of the present invention.

Referring to the block diagram of FIG. 1, one embodiment of a multiplexed recursive filter generally referred to as 10 includes 8-bit programmable read only memories 11, 12, and 13 which store and apply in sequence sets of constants to respective binary outputs 14, 15, and 16 which are also the binary inputs to analog by digital multipliers 17, 18, and 19, respectively. The digital multipliers 17, 18, and 19 each have respective analog inputs 20, 21, and 22 for inputting the signals for multiplication by the binary number on the inputs 14, 15, and 16. The programmable read only memory devices may be well known conventional apparatus that is capable of storing a plurality of 8-bit binary words which are addressed or sequenced in turn in response to an address on input 23 from a conventional sequencing or timing device 24. The digital read only memories may be of the type manufactured and sold by Harris Semiconductors of Melbourne, Fla. as Model No. HPROM 8256, for example, which are capable of storing up to 32 8-bit words. The analog by digital multiplying devices 17, 18 and 19 may be the four quadrant type as described in connection with FIG. 5, for example.

Each of the multipliers 17, 18 and 19 has an output 25, 26 and 27, respectively, on which appears an analog signal which represents the product of its respective analog input 20, 21, and 22, and its associated binary input 14, 15 and 16. The outputs 25, 26 and 27 are input to an operational amplifier or summing device 28.

The analog input 20 to the multiplier 17 is the incoming waveform or waveforms to be filtered; while the input 21 of the multiplier 18 is the output or last stage of an analog shift register or charge coupled device 30. The analog input 22 to the multiplier 19 is the output or last stage of an analog shift register or charge coupled device 31. The charge coupled devices 30 and 31 which may be, for example, of the well-known type manufactured and sold by Fairchild Semi-conductors of Mountain View, Calif. of the type known as (CCD 311) or even the storage device manufactured by Reticon Corp. of Sunnyvale, Calif. known as (SAM 128), are driven to transfer each sampled charge therein to its next succeeding stage by a sampling pulse and a four-phase clock in the timing device 24 schematically shown by way of input lines 29 and 32, respectively. The signal samples from the output of the summing device 28 are output through a scaling and inverting amplifier device 33, the output of which is connected to a first stage of the charge coupled device delay line 30; while the input to the first stage of the delay line 31 is the output or last stage of the delay line 30. An operational amplifier or summing device 34 also has its inputs 35 and 36 connected to the output of the summing device 28 and the output of the multiplier 18, respectively. The device 34 is connected by way of line 37 at its output to the serial input of a demultiplexer 38. The demultiplexer 38 is addressed or sequenced via line 39 from the timing device 24 to provide a parallel output. The serial pulses from the output of the amplifier 34 in response to each timing pulse are sequenced or applied to a respective one of a plurality of output channels to provide the separate discrete outputs of the filter. The demultiplexer 38 may be of the type manufactured by Siliconix Semi-conductor Devices of Santa Clara, Calif., and sold as Model No. DG-506, for example.

In describing the operation of the filter according to one embodiment of the invention, reference will be made to FIGS. 2 and 3 and the timing diagram of FIG. 4 where, as appropriate, like reference characters are used for functions corresponding to the apparatus of FIG. 1.

FIG. 2 demonstrates the operation of a 16-channel filter in accordance with the present invention. During a single sample period, constants G, K1, and K2, are sequenced downwardly in 16 steps to be multiplied by the A/D multipliers 17, 18, and 19, respectively. In the actual embodiment of the invention, the constant L (not shown) is combined with the sampled signal by the summing device 34 (FIG. 1). This can be accomplished because such constants are equal to exactly one-half of the value of the constants K1.

At the same time as the constants G, K1 and K2 are sequenced downwardly, the sample charges S2-16 and S1-16 are sequenced to the right as viewed in FIG. 2. The shifting rate of the charged coupled device delay lines 30 and 31, and the sequencing rate of the constants G, K1, and K2 is required to exceed the sampling rate by the number of samples S2 and S1 stored in each delay line 30 and 31, respectively; and by the number of constants stored in each read only memory 11, 12, and 13. In the described embodiment, each sample is weighted sixteen times to provide a sixteen channel output. For example, at an 800 Hertz data sample rate, which limits the data frequency to 400 Hertz, each sample is present in the filter for 1/800th of a second. Assuming the data samples in the delay lines 30, 31 occupy alternate stages with a zero reference at intervening stages, a four phase clock frequency (32 of FIG. 1) is determined by the sum of 16 data samples and 16 reference samples multiplied by the frequency of 800 Hertz, which amounts to 25.6 Kilohertz. Thus, the sequencing rate of the constants in the read only memories 11, 12, and 13, and the rate of the demultiplexer 38 is one-half of such frequency or 12.8 kilohertz.

The detailed structure and function of the charge coupled device delay lines 30 and 31 form no part of the present invention; and such devices may be any charge coupled device or bucket brigade circuit that performs the overall function as described in connection with and shown in FIG. 3, which is included to provide a better understanding of the present invention.

With reference to FIG. 3, the timing of the device 30, 31 by the timer or clock 24 is so arranged that an input switch S1, alternating, samples data and zero reference at terminals 41 and 42, respectively. At the output, a switch S2 clamps to terminal 43 during zero reference, samples data when in contact with 44 when the switch S1 is in contact with terminal 41, and holds the data between samples when the switch S2 is in the position shown in FIG. 3. It is understood, that the switches S1 and S2 are shown mechanically for simplicity of illustration; but in actual practice such switches may be electronic type switches included for operation with charge couple devices. An output holding capacitor 45, contains only the "time stretched" data samples referred to zero reference. Thus, in a shift register having a predetermined number of stages, one-half of said number are data samples and the other half are zero reference samples, each having a duration of the sampling time T divided by twice the number of samples N.

Figure 4:
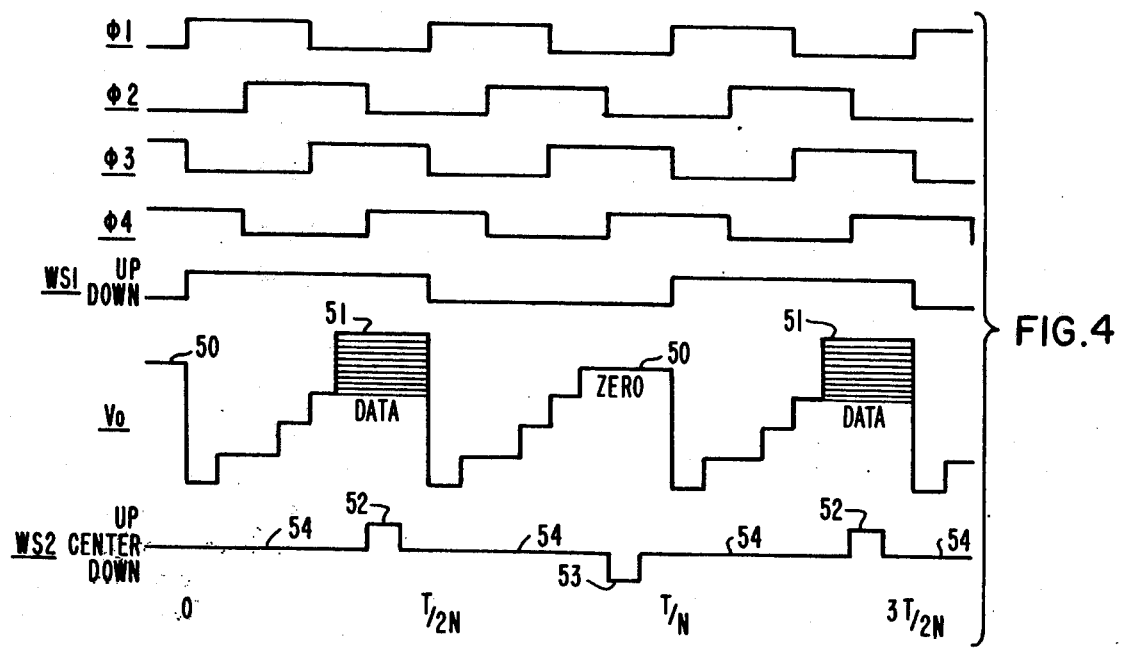
FIG. 4 is a graph illustrating the timing operation of the analog shift register.

Referring to FIG. 4, the key waveforms which are applied to the delay lines 30, 31 include waveforms 51, 52, 53 and 54, which represent the four phase clock (32 of FIG. 3) the function of which is propagate the packets of charge or samples from one stage to the next of the devices 30, 31 in a well-known manner. A waveform Ws1, demonstrates the function of the input switch S1 of FIG. 3. Data is sampled in the "up" position, and zero reference is sampled in the "down" position as shown on such waveform. A waveform Vo represents the appearance of the output voltage on lines 21 and 22 of the delay lines or charge coupled devices 30 and 31, respectively. The portions of the line 50 represents the zero reference pulse that is passed on from stage-to-stage of the device 30, 31; and the portion 51 represent the data sample that is passed down the line from stage-to-stage after being weighted as more specifically described hereinafter. Waveform WS2 represents the output processing function of the switch S2 (FIG. 3). The data 51 is sampled during the "up" position 52, which occurs when the switch is in contact with terminal 44 (FIG. 3), the zero reference 51 is clamped when the switch S2 is in the "down" position 53 or in contact with terminal 43 (FIG. 3). The portion 54 of the waveform WS2 represents the holding of the data 51 between samples. The interval from data sample to data sample is T/N, and the total transport time is T, where N is the number of pairs of stages of each charge couple device shift register or delay line 30, 31.

The overall operation of the multiplexed filter 10 of FIG. 1 is now described with reference to FIG. 2, assuming that the filter is in the condition, with respect to the storage of constants G, K1, K2, as shown in the functional diagram of FIG. 2. During each one 800th of a second, a signal on the input line 20 is multiplied initially by the constant G1 in the device 17. This signal value or voltage is then summed by device 28 with the voltage appearing on lines 26 and 27. The signal on line 26 represents the sample from the stage S2-1 of the device 30 appearing on line 21 multiplied in the device 18 by the constant K1-1 of the read only memory 12. The signal on line 27 represents the sample from the stage S1-1 of the device 31 appearing on line 22 multiplied in the device 19 by the constant K2-1. This sample S2-1 is also weighted by the constant L in the summer 34 (see FIG. 1) and applied to one stage of the demultiplexer 38.

Then, in the same 1/800th of a second, the constants G and K are shifted downwardly as viewed in the drawing and the samples at each stage of the delay lines 30 and 31 are shifted to the right as previously mentioned, so that the sample is now multiplied by the constant G2 in the multiplier 17, and such sample is then summed in the device 28 with the voltage on lines 26 and 27. At this point, the signal or voltage on line 26 is the sample formerly in stage S2-2 and multiplied by the constant K1-2 in the multiplier 18. The voltage on line 27 is the sample transferred from the stage S1-2 appearing on line 22 multiplied in the device 19 by the constant K2-2. This sum, appearing on the line 35 is then summed in the device 34 and output to a second channel of the demultiplexer 38.

During this same 800th of a second, the sample shift to the right and the stages of the delay lines 30 and 31 until the sample in stage S2-16 appears on output line 21 and the sample in stage S1-16 appears on the output lines 22. As previously mentioned, the constants have shifted downwardly until the constant G16 is multiplied in the device 17; the constant K1-16 is multiplied by the device 18; and the constant K2-16 is multiplied by the device 19. During each shift and sequence, a voltage of a different value appears at the input of the demultiplexer 38.

The voltage appearing on line 36 and the voltage on line 35 at the output of the summing device 28 is multiplied by the constant L in device 34 for input to one stage of the demultiplexer 38 on line 35 is multiplied by the product of the constant L2 with the sample transferred to the line 21 from the stage S2-2.

As previously mentioned, the constant L in one actual embodiment of the invention is idential to K1/2 and therefore such constants are multiplied by the device 34 rather than employing an additional read only memory and other hardware to perform the function as shown in FIG. 2. Thus, as the L weighted analog signal to the summing device 34 on line 35 is exactly one-half of the K1 weighted analog signal to the summing device 28 but of opposite polarity, the hardware is simplified by applying the K1 weighted signal on line 36 to the summing device 34 with a fixed weighting of one-half.

The weighting constants K1, K2 and G are determined in accordance with the following formulae:

$$K1 = 2e^{-\Delta W t/2} \cos\left(\left[W_0^2 - \left(\frac{\Delta W}{2}\right)^2\right]^{\frac{1}{2}} T\right)$$

-continued $$K2 = -e^{-\Delta W T}$$

$$L = K1/2$$

$G =$ (determined by signal levels and bandwidth).

The constants K1 determine the center frequency of the filter. The constants K2 determine the bandwidth of the filter. The constants G determine the gain. An example of the values of the various filter constants needed to realize a uniform filter bank with equal spacings and equal bandwidths between each of the channels for a typical six channel device is exemplified in the following table.

| CENTER FREQUENCY IN Hz | BANDWIDTH IN Hz | G | K1 | K2 |
| --- | --- | --- | --- | --- |
| 150 | 5 | 1.00 | 0.75 | −0.96 |
| 170 | 5 | 1.00 | 0.46 | −0.96 |
| 190 | 5 | 1.00 | 0.15 | −0.96 |
| 210 | 5 | 1.00 | −0.15 | −0.96 |
| 230 | 5 | 1.00 | −0.46 | −0.96 |
| 250 | 5 | 1.00 | −0.75 | −0.96 |

The constants needed for a non-uniform filter bank with unequal spacings and unequal bandwidths for a typical six channel filter may be as follows.

| CENTER FREQUENCY IN Hz | BANDWIDTH IN Hz | G | K1 | K2 |
| --- | --- | --- | --- | --- |
| 172.5 | 20 | 0.34 | 0.40 | −0.86 |
| 187.5 | 10 | 0.19 | 0.19 | −0.92 |
| 195.0 | 5 | 0.10 | 0.08 | −0.96 |
| 205.0 | 5 | 0.10 | −0.08 | −0.96 |
| 212.5 | 10 | 0.19 | −0.19 | −0.92 |
| 227.5 | 20 | 0.34 | −0.39 | −0.86 |

Figure 5:
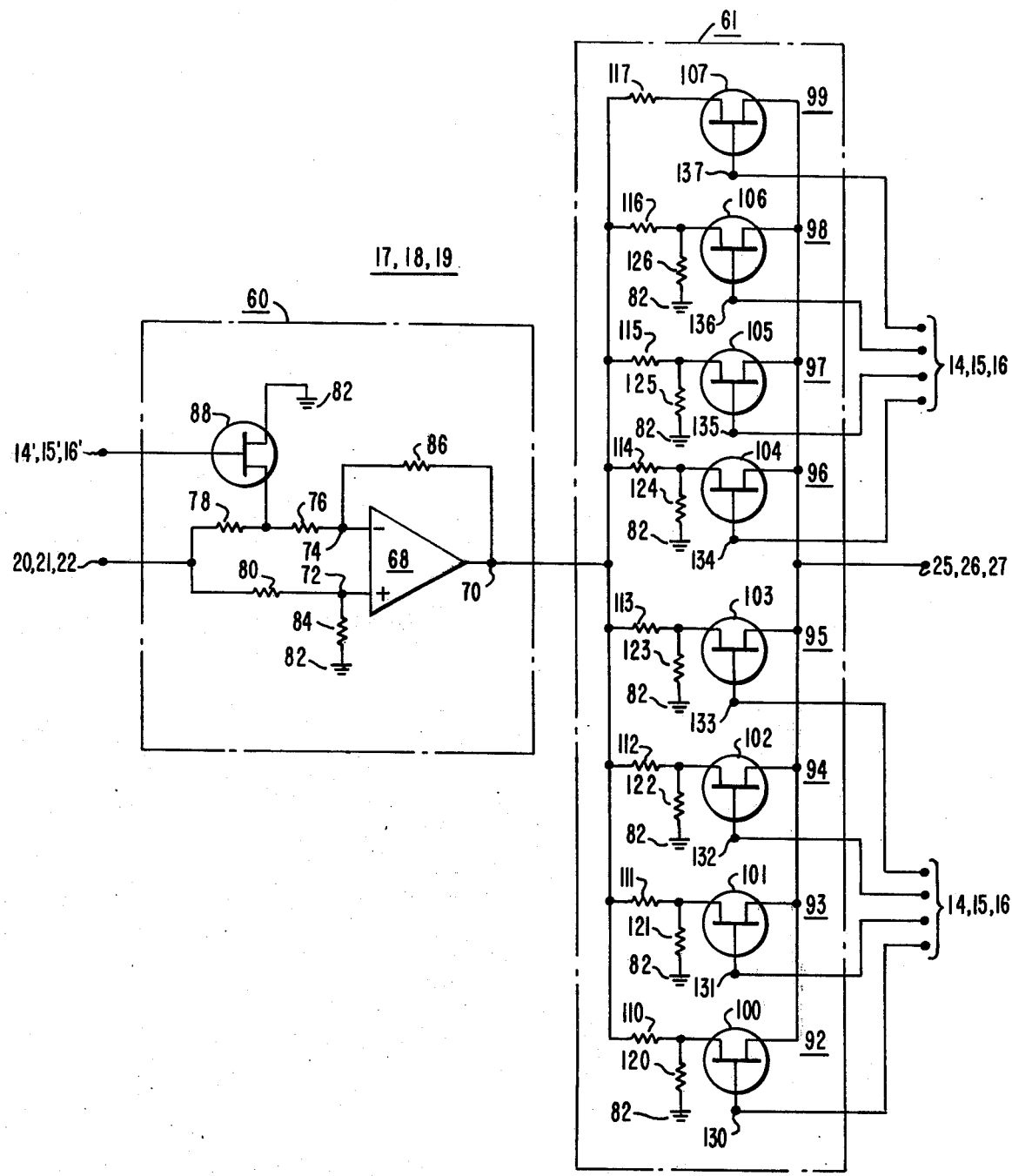
FIG. 5 is a circuit diagram of the analog by digital multiplier that may be used in the filter of the present invention.

FIG. 5 illustrates one of the analog by digital multipliers 17, 18, 19. The digital multiplier expresses the product of an analog value, represented by an analog voltage on its input 20, 21, 22, at a digital value, represented by a digital binary word applied to input 14, 15, 16 and a digital magnitude bit applied to input 14', 15', 16'. An amplifier gain network 60 controls the sign of the analog voltage in relation to the digital binary bit representing the sign of the digital value; and a resistance network 61 controls the magnitude of the analog voltage in relation to the digital binary bits representing the magnitude of the digital value. The output of the resistance network 61 on line 25, 26, 27 is a current whose magnitude and direction represent the magnitude and sign product of tha analog and digital values. The amplifier gain network 60 includes an amplifier 68, which is provided with an output terminal 70, a non-inverting input terminal 72, and an inverting input terminal 74. Inverting input terminal 74 is electrically connected to the analog input terminal 20, 21, 22 through a first input impedance 76, and a second input impedance 78. The non-inverting input terminal 72 is electrically connected to the analog input terminal 20, 21, 22 through a third input impedance 80, and to ground contact 82 through a fourth input impedance 84. The inverting input terminal 74 is connected to the output terminal 70 through a feedback impedance 86. When the digital number has a positive sign, the binary value of the digital sign bit is applied to the terminal 14', 15', 16' causing a switch, which, for example, may be a field effect transistor 88, to close so that the junction of the first input impedance 76 and the second input impedance 78 is selectively coupled to the ground contact 82. When the digital number has a negative sign, the binary value of the digital sign bit causes the field effect transistor 88 to open so that the junction of the input impedances 76 and 78 is electrically isolated from the ground contact 82. Thus, the amplifier gain network 60 provide either a positive or negative gain depending upon the condition of the field effect transistor 88 and the resistive magnitudes of the impedances 76, 78, 80, 84, and 86. When the sign of the digital number of the input 14', 15', 16' is positive and the binary value provided to the digital signs bit input terminal 14', 15', 16' causes the field effect transistor 88 to close, the gain of the amplifier network 60 is positive unity. In the same fashion, when the sign of the digital number is negative and the binary value provided to the digital sign bit input terminal 14', 15', 16' causes the field effect transistor 88 to open, the gain of the amplifier network 60 is negative unity.

The resistance network 61 may be described as including individual networks 92 through 99 inclusive which includes field effect transistor switches 100 through 107 inclusive; branch input impedances 110 through 116 inclusive, and branch ground impedances 120 through 126 inclusive. The conduction of the field effect transistors 100 through 107 is controlled by the binary values of the digital magnitude bits which are provided to the digital magnitude terminals 130 through 137 respectively over the input lines 14, 15, 16 from the read only memories 11, 12 and 13. The field effect transistor switches 100 through 107 are connected to the input impedances 110 through 116 respectively. The resistive magnitude of the impedances 110 through 117 increase progressively such that if the resistance of the branch impedance 117, associated with the most significant digital bit is 200 ohms; the resistance branch impedance 116, associated with the second most significant bit, is 400 ohms. Similarly, the resistance of the branch impedance 115 associated with the third most significant bit, is 800 ohms; the resistance of the branch impedance 114 is associated with the fourth most significant bit is 1600 ohms; and the resistance of the branch impedance 113 associated with the fifth most significant bit is 3200 ohms. The resistance of the branch impedance 112, 111, and 110 would increase in a similar manner. The junction of the field effect transistors 100 through 106 with the respective branch impedances 110 through 117 are connected to the ground potential 82 through the respective branch ground impedances 120 through 126. The resistive magnitude of the ground impedances 120 through 126 decrease progressively such that if the resistance of the branch impedance 117, associated with the most significant digital bit, is 200 ohms, the resistance of the branch ground impedance 126, associated with the second most significant bit, is 400 ohms. Similarly, the resistance of the branch impedance 125 associated with the third most significant bit is 800/3 ohms; the resistance of the branch impedance 124 associated with the fourth most significant bit is 1600/7 ohms; and the resistance of the branch impedance 123 associated with the fifth most significant bit is 3200/15 ohms. The resistances of the branch impedances 122, 121, and 120 decrease in a similar manner.

When the binary value of a digital magnitude bit to zero, the field effect transistor of the network branch associated with that digital magnitude bit is made nonconductive by the signal provided to the respective digital magnitude terminal 130 through 137. When the binary value of a digital magnitude bit is one, the signal provided to the respective digital magnitude terminal makes the associated field effect transistor conductive. In this manner, the current provided by the branches 92 through 99 in which field effect transistors 100 through 107 are conducting provide the output current which represents the product of the analog and digital signals. Thus, the analog by digital multipliers utilized in the filter 10 are four quadrant multipliers which includes an amplifier gain network where the digital sign bit controls the polarity of the gain of an amplifier to determine the product of the digital sign and the analog value, and in which the digital magnitude bits control a multiple a resistor steps of a resistance network to determine the product of the digital magnitude and analog value as previously multiplied by the digital sign bit in the amplifier gain network. For a more detailed explanation of the operation of the multiplier 17, 18, 19 reference is made to U.S. Patent Application Ser. No. 637,549 entitled "A Four Quadrant Analog By Digital Multiplier" filed by John Mattern on Dec. 4, 1975 and assigned to a common assignee, which application is incorporated herein by reference.

The main requirements for the analog signal delay lines 30, 31 for a filter of the present invention are large dynamic range and relatively small charge transfer inefficiency. The interchannel isolation, as referred to the device 30, 31 may be defined by the relative signal content of the charge coupled device output charge packet; that is, the interchannel isolation is equal to the charge remaining from the original signal sample divided by the charge added from the preceding signal charge package. Thus, interchannel isolation is a measure of the extent to which one signal charge packet for a particular independent channel of the filter bank remains free from charge contributions from the preceding signal charge packets corresponding to other independent channels of the filter bank.

Consequently, improved interchannel isolation is obtained by using one or more isolation stages between the stages containing the data samples, at the expense of faster CCD operation and more CCD stages needed for the same filter bank multiplicity.

The one or more isolation cells used for improved interchannel isolation can perform another essential function at the same time. The only requirement on any auxiliary signal carried in the isolation cells is that it not contribute a varying amount of charge to the succeeding data carrying stages, which then becomes indistinguishable from the desired date. Any DC reference level fulfills that requirement, but a specially useful DC reference corresponds to the AC zero signal level. In this case, both the reference AC zero and the analog signal with reference bias appear sequentially interleaved at the CCD output.

Differencing the "reference only" and "signal plus reference" levels via the "clamp-sample-hold" technique of correlated double sampling then yields other important benefits for analog signal processing. Since both the "reference only" sample and "signal plus reference" sample follow the same path, they both interact with the same electrodes and thus give outputs determined by the same set of threshold voltages. Therefore output subtraction cancels any effects of MOS thresholds. For applications where both samples dwell equally long at every point along their path, the leakage charge accumulated in both samples is identical and cancels when the two samples are differenced at the output. Since the recursive filter bank analog delay CCD is such an application, the "isolation/reference-only" sample technique given and accurate zero signal reference with a bipolar AC signal capability in addition to interchannel isolation in excess of 40dB.

I claim:

1. A multiplexed recursive filter, comprising
an analog delay line having a plurality of data sampling stages including input and output stages,
means to transfer serially a predetermined number of discrete voltage samples through the delay line stages from the input to the output stages within one of repetitive predetermined time periods,
means including digital storage and sequencing means to store and output a number of predetermined constants,
means including analog by digital multiplication means to weigh each of the discrete voltage samples with one of said predetermined constants serially within each one of said repetitive time periods to produce weighted voltage samples, and
demultiplexing means to output each one of the weighted voltage samples on a separate channel.

2. A multiplexed recursive filter according to claim 1 wherein the analog delay line includes at least one charge coupled device.

3. A multiplexed recursive filter according to claim 1 wherein the storage and sequencing means is a programmable read only memory.

4. A multiplexed recursive filter according to claim 2 wherein the storage and sequencing means if a programmable read only memory.

5. A multiplexed recursive filter according to claim 1 wherein the multiplication means includes a four quadrant analog by digital multiplier.

6. A multiplexed recursive filter according to claim 3 wherein the multiplication means includes a four quadrant analog by digital multiplier.

7. A multiplexed recursive filter according to claim 1 wherein each of the sample stages in the delay line corresponds to a distinct filtered frequency and bandwidth.

8. A multiplexed recursive filter, comprising
at least two charge coupled devices, each having a plurality of data sampling stages including an input stage for receiving voltage samples and an output data sampling stage, the output stage of one said devices being connected to the input stage of the other;
a plurality of programmable read only memory devices, each operative to store and sequence at its respective output a plurality of constants in binary form;
an analog by digital multiplier for each of the memory devices having its digital input electrically coupled to the output of a respective memory device, each said multiplier having an input and output connected electrically to predetermined ones of said input and output stages;
means to clock the read only memory devices and the charge coupled devices to weight each of the voltage samples at predetermined input and output stages by predetermined ones of said constants in the multiplying devices during each one of repetitive periods; and
demultiplexing means to apply each of the weighted samples to an industrial output during each repetitive time period.

9. A multiplexed recursive filter according to claim 8 wherein the number of data sampling stages in each charge coupled device corresponds to the number of channels of the filter.

* * * * *